United States Patent
Fukasawa et al.

(10) Patent No.: US 12,301,132 B2
(45) Date of Patent: May 13, 2025

(54) MULTIPLE POWER CONVERSION SYSTEM

(71) Applicant: TMEIC Corporation, Chuo-ku (JP)

(72) Inventors: Issei Fukasawa, Tokyo (JP); Masahiro Kinoshita, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 92 days.

(21) Appl. No.: 17/416,623

(22) PCT Filed: Jul. 23, 2019

(86) PCT No.: PCT/JP2019/028871
§ 371 (c)(1),
(2) Date: Jun. 21, 2021

(87) PCT Pub. No.: WO2021/014574
PCT Pub. Date: Jan. 28, 2021

(65) Prior Publication Data
US 2022/0085733 A1    Mar. 17, 2022

(51) Int. Cl.
*H02M 7/493*    (2007.01)
*H02M 1/32*    (2007.01)
*H02M 7/483*    (2007.01)
*H02M 7/537*    (2006.01)

(52) U.S. Cl.
CPC ............. *H02M 7/493* (2013.01); *H02M 1/32* (2013.01); *H02M 7/483* (2013.01); *H02M 7/537* (2013.01)

(58) Field of Classification Search
CPC ...... H02M 7/493; H02M 7/483; H02M 7/537; H02M 7/487; H02M 1/32; H02M 1/325
See application file for complete search history.

(56) References Cited

U.S. PATENT DOCUMENTS

| 5,790,396 A | * | 8/1998 | Miyazaki | ............ | H02M 7/487 |
| | | | | | 363/58 |
| 2011/0051478 A1 | | 3/2011 | Sato et al. | | |
| 2016/0036342 A1 | | 2/2016 | Takubo | | |

(Continued)

FOREIGN PATENT DOCUMENTS

| CN | 1953062 A | 4/2007 |
| JP | 1-122370 A | 5/1989 |

(Continued)

OTHER PUBLICATIONS

International Search Report issued Aug. 27, 2019 in PCT/JP2019/028871 filed Jul. 23, 2019, 2 pages.

(Continued)

*Primary Examiner* — Alex Torres-Rivera
(74) *Attorney, Agent, or Firm* — Oblon, McClelland, Maier & Neustadt, L.L.P.

(57) ABSTRACT

A multiple power conversion system includes a plurality of first to n-th unit power converters. DC positive sides of the plurality of unit power converters are connected to one another, DC negative sides of the plurality of unit power converters are connected to one another, and n is an integer of two or more. The multiple power conversion system further includes a detector to detect a current flowing through the DC positive side or the DC negative side of a corresponding one of (n−1) or more of the plurality of unit power converters. The multiple power conversion system that can detect a circulating current with a smaller number of current sensors.

7 Claims, 21 Drawing Sheets

(56) References Cited

U.S. PATENT DOCUMENTS

| | | | | |
|---|---|---|---|---|
| 2016/0248315 | A1* | 8/2016 | Basic | H02M 7/493 |
| 2017/0302154 | A1* | 10/2017 | Tada | H02M 7/483 |
| 2018/0191270 | A1* | 7/2018 | Correa Vasquez | H02M 7/487 |
| 2018/0366943 | A1 | 12/2018 | Matsuoka et al. | |
| 2019/0165689 | A1* | 5/2019 | Soto | H02M 7/23 |
| 2022/0069698 | A1* | 3/2022 | Fukasawa | H02M 1/327 |

FOREIGN PATENT DOCUMENTS

| | | |
|---|---|---|
| JP | 4-322173 A | 11/1992 |
| JP | 6-319263 A | 11/1994 |
| JP | 11-46481 A | 2/1999 |
| JP | 2004-15923 A | 1/2004 |
| JP | 2005-185003 A | 7/2005 |
| JP | 2014-236530 A | 12/2014 |
| JP | 5739734 B2 | 6/2015 |
| WO | WO 2010/095241 A1 | 8/2010 |
| WO | WO 2017/006400 A1 | 1/2017 |

OTHER PUBLICATIONS

International Preliminary Examination Report issued Jun. 16, 2020 in PCT/JP2019/028871 filed Jul. 23, 2019 (with English machine translation), 18 pages.
Indian Office Action issued Feb. 28, 2022 Indian Patent Application No. 202117029503, 5 pages.
Notice of Reasons for Refusal issued Dec. 20, 2022 in Japanese Patent Application No. 2021-534459 (with English machine translation), 8 pages.
Extended European Search Report issued Jan. 9, 2023 in European Patent Application No. 19938114.6, 9 pages.
Jie Shen, et al., "A High-Performance 2x27 MVA Machine Test Bench Based on Multilevel IGCT Converters," 2014 IEEE Energy Conversion Congress and Exposition (ECCE), XP032680994, 2014, pp. 3224-3233.
Chinese First Office Action issued May 31, 2023, in Chinese Patent Application No. 201980085810.2, therein, 16 pages (with English Translation).
Office Action issued Jan. 22, 2024 in corresponding European Patent Application No. 19938114.6.

* cited by examiner

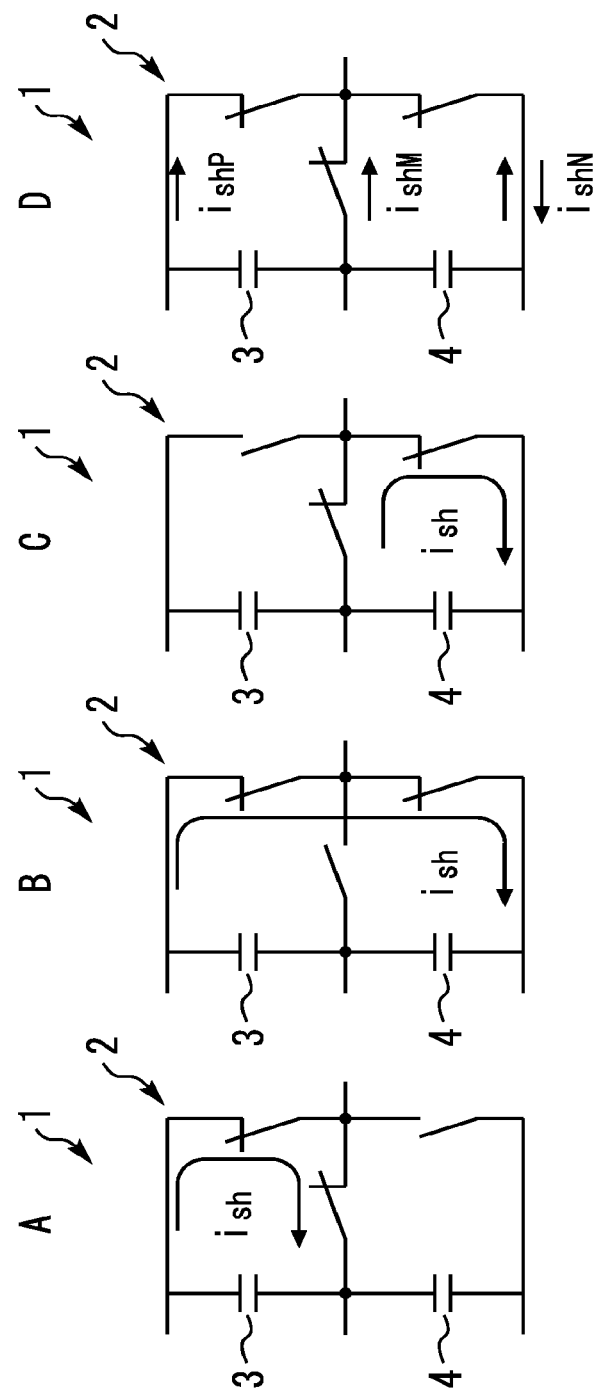

FIG. 8

| | $\Delta i_{iP1}$ | | $\Delta i_{iN1}$ | |
|---|---|---|---|---|
| MODE A | $\left(1-\dfrac{1}{n}\right)\dfrac{C_N}{C_P+C_N}i_{sh}$ | NEW (1) | $-\left(1-\dfrac{1}{n}\right)\dfrac{C_N}{C_P+C_N}i_{sh}$ | NEW (2) |
| MODE B | $\left(1-\dfrac{1}{n}\right)i_{sh}$ | NEW (3) | $-\left(1-\dfrac{1}{n}\right)i_{sh}$ | NEW (4) |
| MODE C | $\left(1-\dfrac{1}{n}\right)\dfrac{C_P}{C_P+C_N}i_{sh}$ | NEW (5) | $-\left(1-\dfrac{1}{n}\right)\dfrac{C_P}{C_P+C_N}i_{sh}$ | NEW (6) |
| MODE D | $\left(1-\dfrac{1}{n}\right)\dfrac{(C_P+C_N)i_{shP}+C_P i_{shM}}{C_P+C_N}$ | NEW (7) | $-\left(1-\dfrac{1}{n}\right)\dfrac{(C_P+C_N)i_{shN}-C_N i_{shM}}{C_P+C_N}$ | NEW (8) |

FIG. 9

| | $\Delta i_{jP1}$ | | $\Delta i_{jN1}$ | |
|---|---|---|---|---|
| MODE A | $-\dfrac{1}{n}\dfrac{C_N}{C_P+C_N}i_{sh}$ | NEW (9) | $\dfrac{1}{n}\dfrac{C_N}{C_P+C_N}i_{sh}$ | NEW (10) |
| MODE B | $-\dfrac{1}{n}i_{sh}$ | NEW (11) | $\dfrac{1}{n}i_{sh}$ | NEW (12) |
| MODE C | $-\dfrac{1}{n}\dfrac{C_P}{C_P+C_N}i_{sh}$ | NEW (13) | $\dfrac{1}{n}\dfrac{C_P}{C_P+C_N}i_{sh}$ | NEW (14) |
| MODE D | $-\dfrac{1}{n}\dfrac{(C_P+C_N)i_{shP}+C_P i_{shM}}{C_P+C_N}$ | NEW (15) | $\dfrac{1}{n}\dfrac{(C_P+C_N)i_{shN}-C_N i_{shM}}{C_P+C_N}$ | NEW (16) |

FIG. 14

|  | $\Delta i_{iP1}$ | $\Delta i_{iN1}$ | $\Delta i_{iM1}$ |
|---|---|---|---|
| MODE A | $\left(1-\frac{1}{n}\right)i_{sh}$ | 0 | $-\left(1-\frac{1}{n}\right)i_{sh}$ |
| MODE B | $\left(1-\frac{1}{n}\right)i_{sh}$ | $-\left(1-\frac{1}{n}\right)i_{sh}$ | 0 |
| MODE C | 0 | $-\left(1-\frac{1}{n}\right)i_{sh}$ | $\left(1-\frac{1}{n}\right)i_{sh}$ |
| MODE D | $\left(1-\frac{1}{n}\right)i_{shP}$ | $-\left(1-\frac{1}{n}\right)i_{shN}$ | $\left(1-\frac{1}{n}\right)i_{shM}$ |

FIG. 15

|  | $\Delta i_{jP1}$ | $\Delta i_{jN1}$ | $\Delta i_{jM1}$ |
|---|---|---|---|
| MODE A | $-\frac{1}{n}i_{sh}$ | 0 | $\frac{1}{n}i_{sh}$ |
| MODE B | $-\frac{1}{n}i_{sh}$ | $\frac{1}{n}i_{sh}$ | 0 |
| MODE C | 0 | $\frac{1}{n}i_{sh}$ | $-\frac{1}{n}i_{sh}$ |
| MODE D | $-\frac{1}{n}i_{shP}$ | $\frac{1}{n}i_{shN}$ | $-\frac{1}{n}i_{shM}$ |

FIG. 17

|        | $\Delta i_{iP1} - \Delta i_{iN1}$ | $\Delta i_{jP1} - \Delta i_{jN1}$ |
|--------|-----------------------------------|-----------------------------------|
| MODE A | $\left(1-\dfrac{1}{n}\right) i_{sh}$ | $-\dfrac{1}{n} i_{sh}$ |
| MODE B | $2\left(1-\dfrac{1}{n}\right) i_{sh}$ | $-\dfrac{2}{n} i_{sh}$ |
| MODE C | $\left(1-\dfrac{1}{n}\right) i_{sh}$ | $-\dfrac{1}{n} i_{sh}$ |
| MODE D | $\left(1-\dfrac{1}{n}\right)(i_{shP} + i_{shN})$ | $-\dfrac{1}{n}(i_{shP} + i_{shN})$ |

MULTIPLE POWER CONVERSION SYSTEM

FIELD

The present invention relates to a multiple power conversion system.

BACKGROUND

PTL 1 discloses a multiple power conversion system including a plurality of three-level power converters. The multiple power conversion system can prevent temperature rise in a DC smoothing capacitor and stabilize a potential of a DC bus.

CITATION LIST

Patent Literature

[PTL 1] JP H11-046481 A

SUMMARY

Technical Problem

In the multiple power conversion system disclosed in PTL 1, a circulating current may flow among the plurality of power converters. To detect the circulating current, a current sensor may be provided in each phase on an AC side of the plurality of power converters. In this case, the number of current sensors is large.

The present invention is made to solve the above-described issues. The object of the present invention is to provide a multiple power conversion system that can detect the circulating current with a small number of current sensors.

Solution to Problem

A multiple power conversion system according to the present invention includes: a plurality of first to n-th unit power converters, DC positive sides of the plurality of unit power converters being connected to one another, DC negative sides of the plurality of unit power converters being connected to one another, n being an integer of two or more; and means each for detecting a current flowing through the DC positive side or the DC negative side of a corresponding one of (n−1) or more of the plurality of unit power converters.

A multiple power conversion system according to the present invention includes: a plurality of unit power converters, DC positive sides of the plurality of unit power converters being connected to one another, DC negative sides of the plurality of unit power converters being connected to one another, DC neutral points of the plurality of unit power converters being connected to one another; and a plurality of current sensors each configured to detect a current flowing through the DC neutral point of a corresponding one of the plurality of unit power converters.

Advantageous Effects of Invention

According to these inventions, the circulating current is detected based on detection results of the current sensors provided on a DC side. Therefore, the circulating current can be detected with a small number of current sensors.

BRIEF DESCRIPTION OF DRAWINGS

FIG. 7 is a diagram illustrating short-circuit failure modes of the unit power converter in the multiple power conversion system according to Embodiment 1.

FIG. 8 is a diagram illustrating theoretical values of a nonuniform amount when a short circuit occurs in the multiple power conversion system according to Embodiment 1.

FIG. 9 is a diagram illustrating the theoretical values of the nonuniform amount when a short circuit occurs in the multiple power conversion system according to Embodiment 1.

FIG. 14 is a diagram illustrating theoretical values of a nonuniform amount when a short circuit occurs in the multiple power conversion system according to Embodiment 2.

FIG. 15 is a diagram illustrating the theoretical values of the nonuniform amount when a short circuit occurs in the multiple power conversion system according to Embodiment 2.

FIG. 17 is a diagram illustrating theoretical values of a nonuniform amount when a short circuit occurs in the multiple power conversion system according to Embodiment 3.

DESCRIPTION OF EMBODIMENTS

Figure 1:
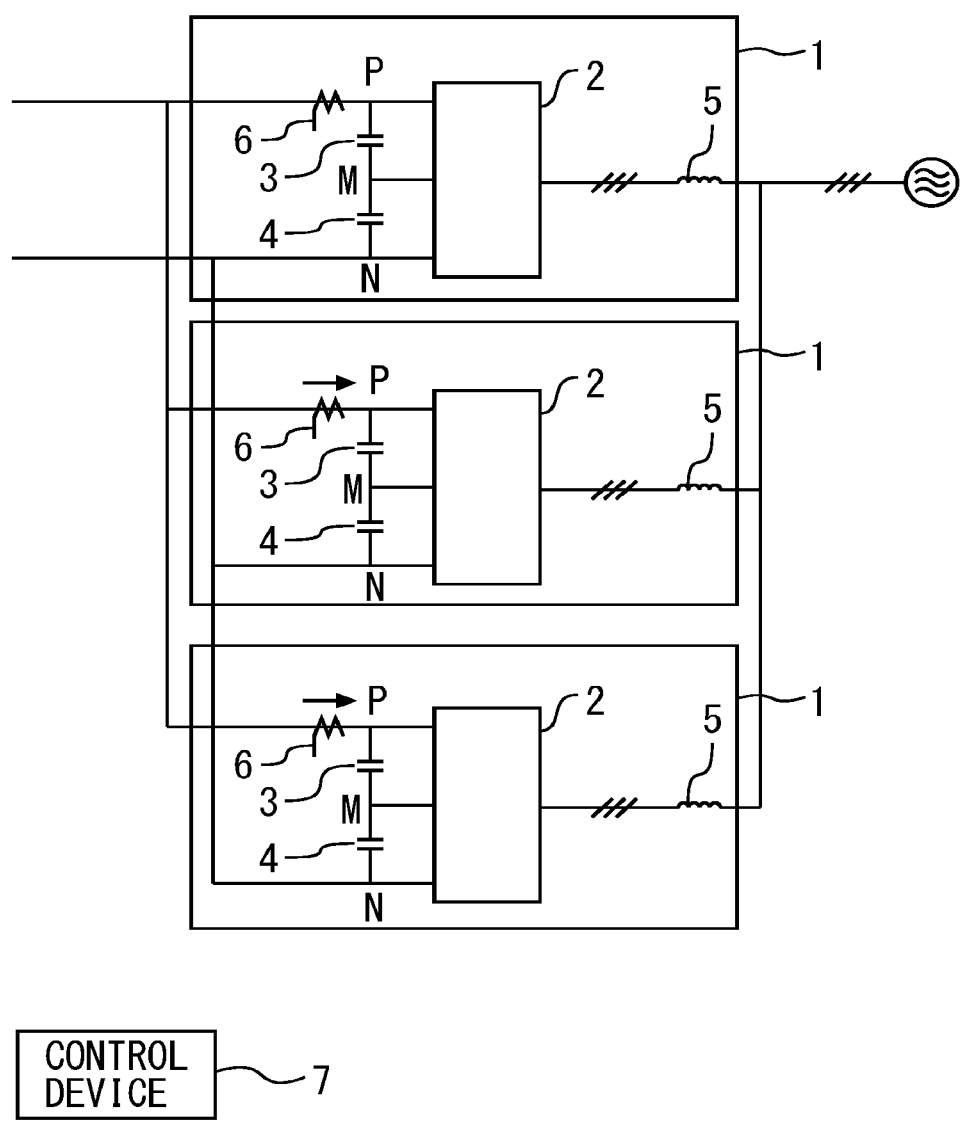
FIG. 1 is a configuration diagram of a multiple power conversion system according to Embodiment 1.

Some embodiments of the present invention are described with reference to accompanying drawings. Note that, in the drawings, the same or equivalent parts are denoted by the same reference numerals. Repetitive descriptions of the parts are appropriately simplified or omitted.

Embodiment 1

FIG. 1 is a configuration diagram of a multiple power conversion system according to Embodiment 1.

As illustrated in FIG. 1, the multiple power conversion system includes a plurality of unit power converters 1. For example, in each of the plurality of unit power converters 1, a DC side is connected to an unillustrated DC power supply. For example, in each of the plurality of unit power converters 1, an AC side is connected to an AC load.

Each of the plurality of unit power converters 1 includes a switching element group 2, a positive-side DC capacitor 3, a negative-side DC capacitor 4, and a plurality of reactors 5.

The switching element group 2 includes a plurality of unillustrated switching elements.

The positive-side DC capacitor 3 is connected between a DC positive side P and a DC neutral point M in each of the unit power converters 1. The negative-side DC capacitor 4 is connected between a DC negative side N and the DC neutral point M in each of the unit power converters 1.

In FIG. 1, only one of the plurality of reactors 5 is illustrated. Each of the plurality of reactors 5 is connected in series to each phase on the AC side.

In the plurality of unit power converters 1, the DC positive sides P are connected to one another. The DC negative sides N are connected to one another. The DC neutral points M are not connected to one another.

For example, a plurality of DC side current sensors 6 are provided on the respective DC positive sides P of the plurality of unit power converters 1. Each of the plurality of DC side current sensors 6 is provided to detect a current flowing through the DC positive side P of the corresponding one of the plurality of unit power converters 1.

For example, the plurality of DC side current sensors 6 are provided on the respective DC negative sides N of the plurality of unit power converters 1 in some cases. In this case, each of the plurality of DC side current sensors 6 is provided to detect a current flowing through the DC negative side N of the corresponding one of the plurality of unit power converters 1.

For example, a control device 7 transmits the same gate signal to each of the plurality of unit power converters 1. For example, the control device 7 transmits, to each of the plurality of unit power converters 1, a gate signal generated from the same voltage instruction value and different carrier waves.

The control device 7 calculates a nonuniform amount of the current flowing through each of the plurality of unit power converters 1 based on detection results of the plurality of DC side current sensors 6.

For example, the control device 7 detects the current nonuniform amount in each of n unit power converters 1 configuring the multiple power conversion system. More specifically, for example, the control device 7 calculates the nonuniform amount of the current flowing through each of the unit power converters 1 by using the following expression (1) while the current flowing through an i-th unit power converter 1 of the n unit power converters 1 is denoted by $i_i$.

[Math. 1]

$$\Delta i_i = i_i - \frac{1}{n}\sum_{k=1}^{n} i_k \quad (1)$$

The control device 7 controls operation of the switching element groups 2 of the plurality of unit power converters 1 based on calculation results of the current nonuniform amounts.

Next, a first example of each of the unit power converters 1 is described with reference to FIG. 2.

Figure 2:
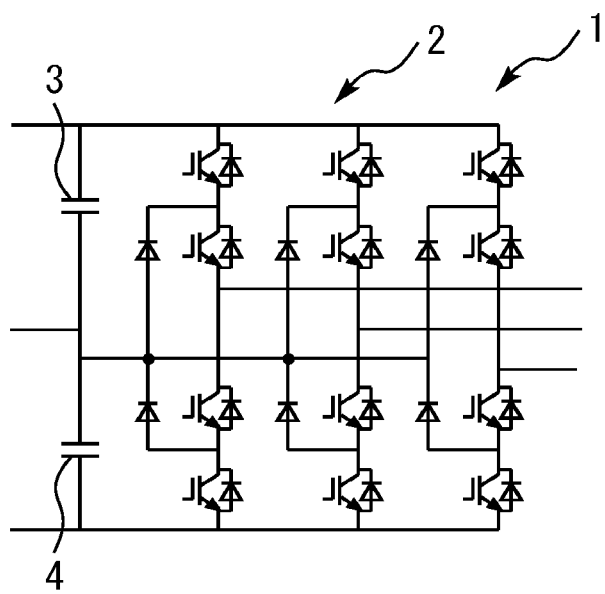
FIG. 2 is a configuration diagram of a first example of a unit power converter in the multiple power conversion system according to Embodiment 1.

FIG. 2 is a configuration diagram of the first example of one unit power converter in the multiple power conversion system according to Embodiment 1.

FIG. 2 illustrates a configuration example of the three-phase three-level unit power converter 1 using self-excited semiconductor devices and diodes. In the unit power converter 1, the positive-side DC capacitor 3 and the negative-side DC capacitor 4 are connected in series between DC terminals, and the DC neutral point is present at an intermediate point. When an on signal or an off signal is applied to a gate of each of the self-excited semiconductor devices inside the unit power converter 1, the potential at any of the DC positive side P, the DC neutral point M, and the DC negative side N is output to an AC terminal of each phase based on the signals.

Next, a second example of each of the unit power converters 1 is described with reference to FIG. 3.

Figure 3:
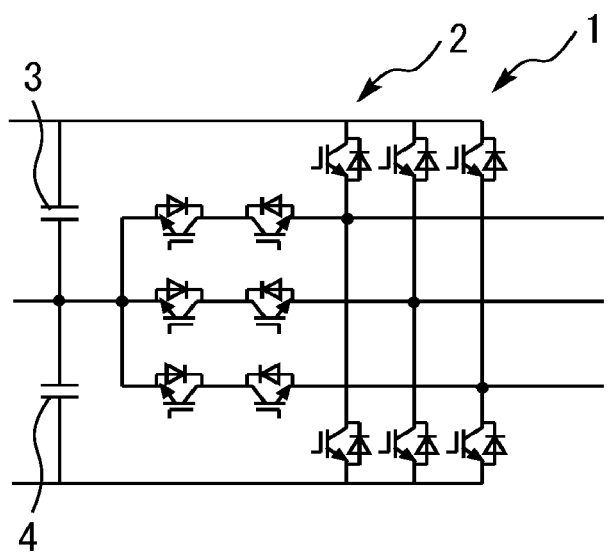
FIG. 3 is a configuration diagram of a second example of the unit power converter in the multiple power conversion system according to Embodiment 1.

FIG. 3 is a configuration diagram of the second example of one unit power converter in the multiple power conversion system according to Embodiment 1.

FIG. 3 illustrates a configuration example of the three-phase three-level unit power converter 1 using self-excited semiconductor devices and diodes. Also in the unit power converter 1, as with the unit power converter 1 illustrated in FIG. 2, when an on signal or an off signal is applied to a gate of each of the self-excited semiconductor devices inside the unit power converter 1, the potential at any of the DC positive side P, the DC neutral point M, and the DC negative side N is output to the AC terminal of each phase based on the signals.

Here, two configurations of the three-phase three-level unit power converter 1 are illustrated; however, the configuration of the unit power converter 1 is not limited to these two configurations. Further, the example of the three-phase unit power converter 1 is illustrated; however, the number of phases may be optional number without limitation to the three phase. Further, the example of the three-level unit power converter 1 is illustrated; however, the number of levels of the unit power converter 1 is not limited to three, and may be an optional number of three or more.

Next, a method of suppressing a circulating current is described with reference to FIG. 4.

Figure 4:
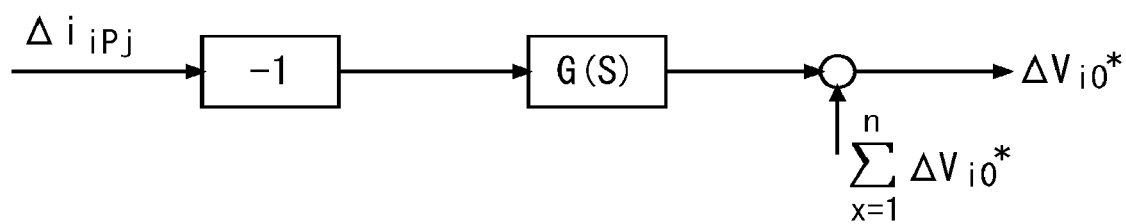
FIG. 4 is a block diagram to explain a method of suppressing a circulating current in the multiple power conversion system according to Embodiment 1.

FIG. 4 is a block diagram to explain the method of suppressing the circulating current in the multiple power conversion system according to Embodiment 1.

In FIG. 4, G(s) represents a low-pass filter and a feedback gain. A zero-phase voltage (nonuniform amount $\Delta v_{io}$) is output to the AC side of the unit power converter 1 in a direction of suppressing a zero-phase circulating current (nonuniform amount $\Delta i_{io}$).

The control device 7 calculates a target value $\Delta v_{io}^*$ of the nonuniform amount of the zero-phase voltage for each of the plurality of unit power converters 1. The control device 7 detects a current nonuniform amount $\Delta i_{iPj}$ of the current and operates the voltage $v_{io}$, thereby controlling the current nonuniform amount $\Delta i_{io}$.

Next, a method of protecting the unit power converters 1 is described with reference to FIG. 5.

Figure 5:
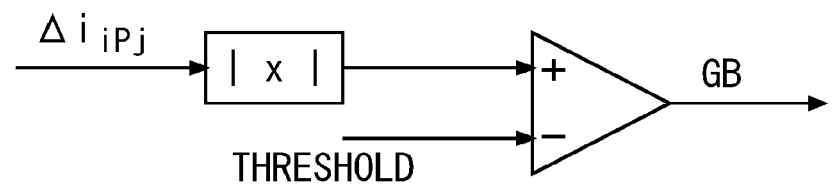
FIG. 5 is a block diagram to explain a method of protecting unit power converters 1 in the multiple power conversion system according to Embodiment 1.

FIG. 5 is a block diagram to explain the method of protecting the unit power converters 1 in the multiple power conversion system according to Embodiment 1.

In FIG. 5, the control device 7 calculates the nonuniform amount $\Delta i_{iPj}$ of the current flowing through each of the unit power converters 1, and determines whether the calculated value is greater than a preset threshold. In a case where the nonuniform amount $\Delta i_{iPj}$ of the current flowing through each of the unit power converters 1 is greater than the preset threshold, the control device 7 performs protective operation. More specifically, the control device 7 transmits a gate block signal GB to turn off the plurality of switching element groups 2.

Next, a principle of detecting short-circuit failure is described with reference to FIG. 6 and FIG. 7.

Figure 6:
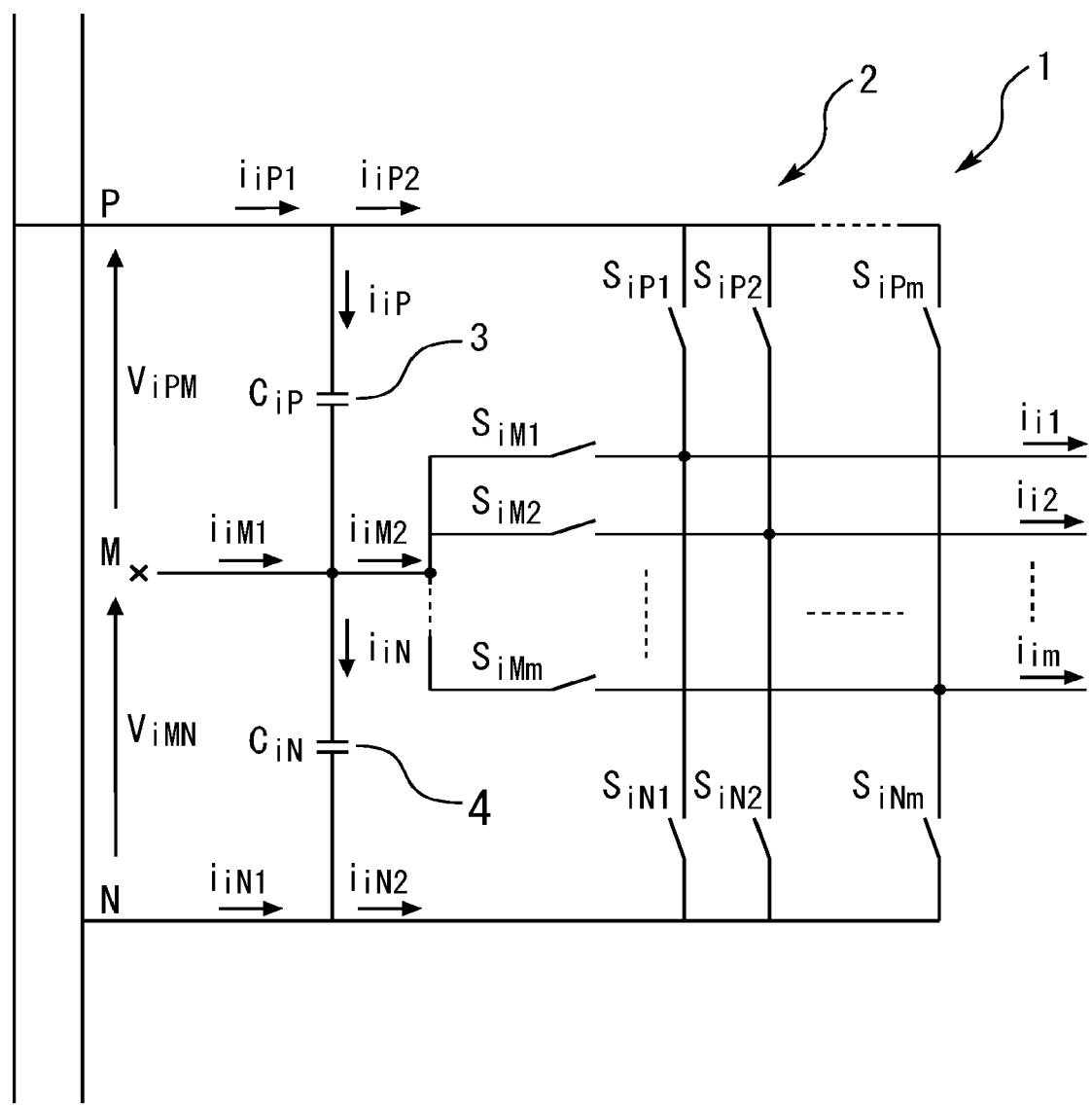
FIG. 6 is a configuration diagram of a main part of the unit power converter in the multiple power conversion system according to Embodiment 1.

FIG. 6 is a configuration diagram of a main part of one unit power converter in the multiple power conversion system according to Embodiment 1. FIG. 7 is a diagram illustrating short-circuit failure modes of the unit power converter in the multiple power conversion system according to Embodiment 1.

In a case where physical amounts are defined as illustrated in FIG. 6 and FIG. 7, the control device 7 detects the short-circuit failure based on the detected value of the DC side current sensor 6. FIG. 7 illustrates a path through which the current flows when the short-circuit failure occurs. There are modes A to D depending on a position of the short-circuit failure.

FIG. 8 and FIG. 9 are diagrams illustrating theoretical values of the nonuniform amount when the short circuit occurs in the multiple power conversion system according to Embodiment 1.

A physical amount with a subscript i is a physical amount in the unit power converter in which the short-circuit failure has occurred, and a physical amount with a subscript j is a physical amount in the unit power converter other than the unit power converter in which the short-circuit failure has occurred. In the power converter in which the short-circuit failure has occurred, the current nonuniform amount on the DC positive side P is $\Delta i_{iP1}$, and the current nonuniform amount on the DC negative side N is $\Delta i_{iN1}$. In the power converter other than the power converter in which the short-circuit failure has occurred, the current nonuniform amount on the DC positive side P is $\Delta i_{jP1}$, and the current nonuniform amount on the DC negative side N is $\Delta i_{jN1}$.

In a case where the short-circuit failure of the mode A has occurred, the theoretical value of the nonuniform amount in a unit power converter i in which the short-circuit failure has occurred is represented by a new expression (1) or a new expression (2). The new expression (1) represents the nonuniform amount of the detected value in a case where the DC side current sensor 6 is provided on the DC positive side P, and the new expression (2) represents the nonuniform amount of the detected value in a case where the DC side current sensor 6 is provided on the DC negative side N.

In a case where the short-circuit failure of the mode B has occurred, the theoretical value of the nonuniform amount in the unit power converter i in which the short-circuit failure has occurred is represented by a new expression (3) or a new expression (4). The new expression (3) represents the nonuniform amount of the detected value in the case where the DC side current sensor 6 is provided on the DC positive side P, and the new expression (4) represents the nonuniform amount of the detected value in the case where the DC side current sensor 6 is provided on the DC negative side N.

In a case where the short-circuit failure of the mode C has occurred, the theoretical value of the nonuniform amount in the unit power converter i in which the short-circuit failure has occurred is represented by a new expression (5) or a new expression (6). The new expression (5) represents the nonuniform amount of the detected value in the case where the DC side current sensor 6 is provided on the DC positive side P, and the new expression (6) represents the nonuniform amount of the detected value in the case where the DC side current sensor 6 is provided on the DC negative side N.

In a case where the short-circuit failure of the mode D has occurred, the theoretical value of the nonuniform amount in the unit power converter i in which the short-circuit failure has occurred is represented by a new expression (7) or a new expression (8). The new expression (7) represents the nonuniform amount of the detected value in the case where the DC side current sensor 6 is provided on the DC positive side P, and the new expression (8) represents the nonuniform amount of the detected value in the case where the DC side current sensor 6 is provided on the DC negative side N.

Accordingly, a value smaller than the nonuniform amounts in the new expressions (1) to (8) is set as the threshold to be compared with the nonuniform amount, which makes it possible to detect the short-circuit failure of the unit power converter.

Note that, in a case where the number n of unit power converters is three or more, the nonuniform amount of the unit power converter (with subscript i) in which the short-circuit failure has occurred becomes greater than the nonuniform amount of each of the other unit power converters (with subscript j) Therefore, the nonuniform amounts of the respective unit power converters detected by the control device are compared, and the unit power converter having the greatest nonuniform amount can be specified as the unit power converter in which the failure has occurred. This is because $(1-1/n) > 1/n$ is established.

Next, outline of the operation by the control device 7 is described with reference to FIG. 10.

Figure 10:
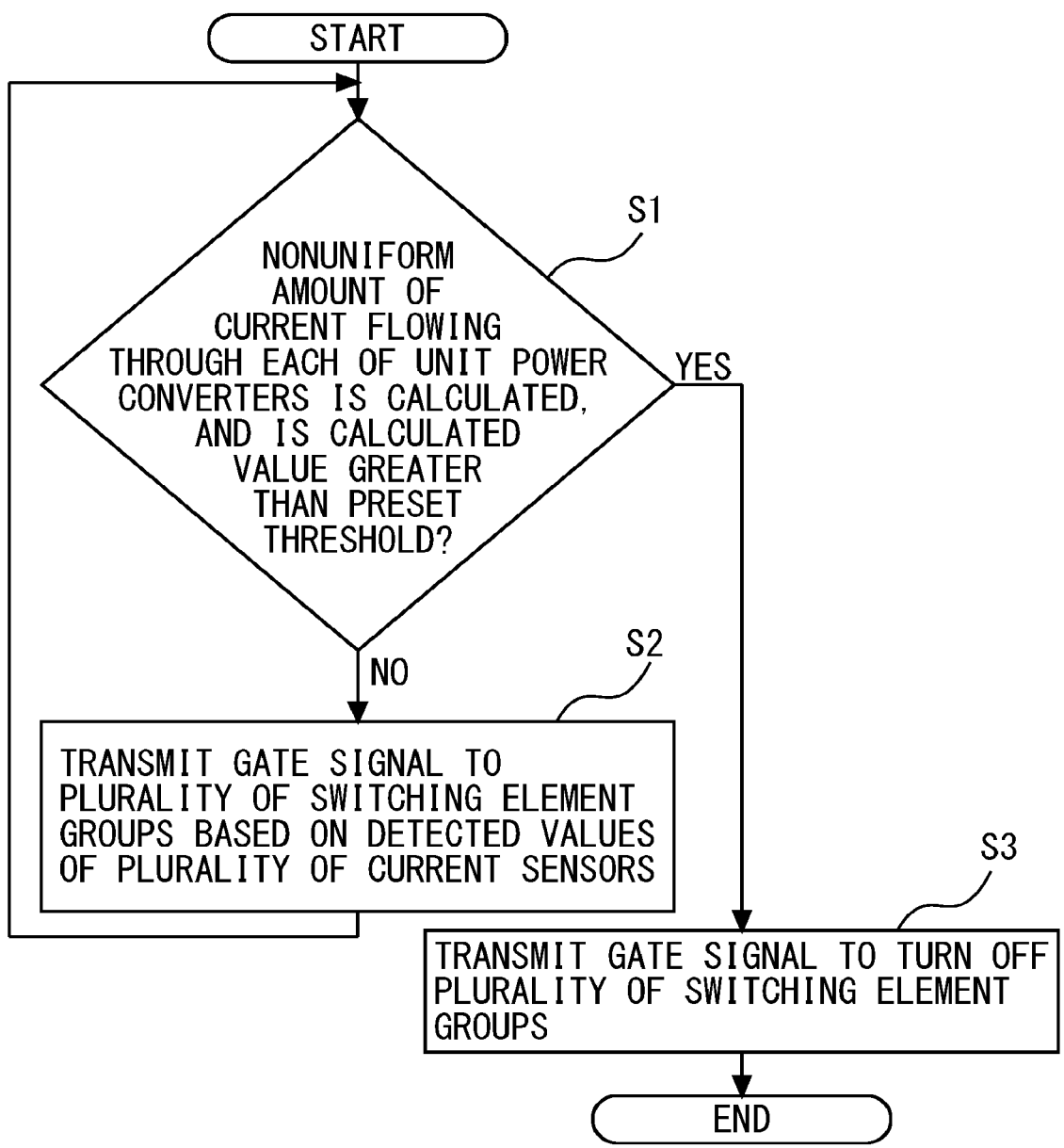
FIG. 10 is a flowchart to explain outline of operation of a control device of the multiple power conversion system according to Embodiment 1.

FIG. 10 is a flowchart to explain the outline of the operation by the control device in the multiple power conversion system according to Embodiment 1.

In step S1, the control device 7 calculates the nonuniform amount of the current flowing through each of the unit power converters 1, and determines whether the calculated value is greater than the preset threshold.

In a case where the nonuniform amount of the current flowing through each of the unit power converters 1 is not greater than the preset threshold in step S1, the control device 7 performs operation in step S2. In step S2, the control device 7 transmits the gate signal to the plurality of switching element groups 2 based on the voltage instruction value. Thereafter, the control device 7 performs the operation in step S1.

In a case where the nonuniform amount of the current flowing through each of the unit power converters 1 is greater than the preset threshold in step S1, the control device 7 performs operation in step S3. In step S3, the control device 7 transmits the gate signal to turn off the plurality of switching element groups 2. Thereafter, the control device 7 ends the operation.

According to Embodiment 1 described above, the circulating current is detected based on the detection results of the DC side current sensors 6. Therefore, the circulating current can be detected with a small number of current sensors.

Note that the circulating current may be detected based on the detection results of the DC side current sensors 6 in the number smaller by one than the number of unit power converters 1. In this case, the circulating current can be detected with a smaller number of current sensors.

Further, the plurality of unit power converters 1 are controlled based on the detection results of the DC side current sensors 6. Therefore, the circulating current can be suppressed with a small number of current sensors.

Further, the control device 7 transmits the gate signal of the plurality of unit power converters 1 based on the detection results of the plurality of DC side current sensors 6, thereby suppressing a zero-phase component of the circulating current. A margin to a rated current of a component (mainly, AC reactor) rating considering superimposition can be made small, which makes it possible to suppress an excess cost.

Further, the control device 7 turns off at least one switching element of the plurality of unit power converters 1 based on the detection results of the plurality of DC side current sensors 6. Accordingly, when the short-circuit failure, abnormal reduction in a capacity, or abnormal increase in a leakage current of the positive-side DC capacitor 3 or the negative-side DC capacitor 4 is detected, it is possible to prevent overheat, rupture, and liquid leakage of the positive-side DC capacitor 3 or the negative-side DC capacitor 4.

Although the principle of detecting the failure in the case where the short-circuit failure of the switching element occurs has been described above, occurrence of abnormality, for example, the short-circuit failure, the capacity reduction, and the increase in a leakage current of the positive-side DC capacitor or the negative-side DC capacitor, and abnormal reduction of inductance caused by interlayer short-circuit failure of the AC reactor is also detectable without limitation to the short-circuit failure of the switching element. This is because, in a case where such abnormality occurs, the nonuniform amount of the detected value of each of the DC side current sensors 6 has a certain magnitude, and abnormality can be determined when the detection threshold is set lower than the magnitude.

Note that, in a case where the current detected value at a point exceeds the threshold, it may be determined that abnormality of any of the short-circuit failure of the switching element, the short-circuit failure of the DC capacitor, release failure (on failure) of the switching element, the abnormal reduction in the capacity of the DC capacitor, and the abnormal reduction of the inductance caused by interlayer short circuit of the AC reactor occurs. For example, the abnormality may be determined by a method similar to the method disclosed in JP 2017-22816 A.

Further, in each of the plurality of unit power converters 1, a switch may be provided on at least one of the DC positive side and the DC negative side. At this time, based on the detected values of the plurality of current sensors, the switch may be turned off in the unit power converter 1 in failure, and operation may be performed only by the sound unit power converters 1.

Next, an example of the control device 7 is described with reference to FIG. 11.

Figure 11:
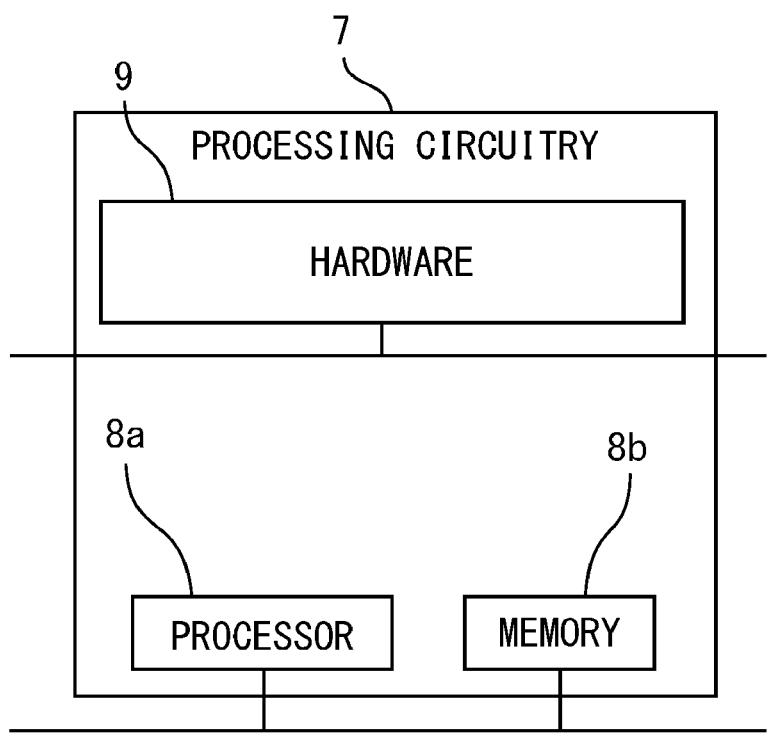
FIG. 11 is a hardware configuration diagram of the control device in the multiple power conversion system according to Embodiment 1.

FIG. 11 is a hardware configuration diagram of the control device in the multiple power conversion system according to Embodiment 1.

The functions of the control device 7 can be realized by a processing circuitry. For example, the processing circuitry includes at least one processor 8a and at least one memory 8b. For example, the processing circuitry includes at least one dedicated hardware 9.

In a case where the processing circuitry includes the at least one processor 8a and the at least one memory 8b, each of the functions of the control device 7 is realized by software, firmware, or a combination of the software and the firmware. At least one of the software and the firmware is described as a program. At least one of the software and the firmware is stored in the at least one memory 8b. The at least one processor 8a reads out and executes a program stored in the at least one memory 8b, to realize each of the functions of the control device 7. The at least one processor 8a is also referred to as a central processing unit, a processing device, a calculation device, a microprocessor, a microcomputer, or a DSP. For example, the at least one memory 8b is a nonvolatile or volatile semiconductor memory such as a RAM, a ROM, a flash memory, an EPROM, and an EEPROM, a magnetic disk, a flexible disk, an optical disk, a compact disk, a minidisk, or a DVD.

In the case where the processing circuitry includes the at least one dedicated hardware 9, the processing circuitry is realized by, for example, a single circuit, a composite circuit, a programmed processor, a parallel-programmed processor, an ASIC, a FPGA, or a combination thereof. For example, the functions of the control device 7 are each realized by the processing circuitry. For example, the functions of the control device 7 are collectively realized by the processing circuitry.

A part of the functions of the control device 7 may be realized by the dedicated hardware 9, and the other functions may be realized by the software or the firmware. For example, the function of transmitting the gate signal may be realized by the processing circuitry serving as the dedicated hardware 9, and the functions other than the function of transmitting the gate signal may be realized in such a manner that the at least one processor 8a reads out and executes programs stored in the at least one memory 8b.

As described above, the processing circuitry realizes the functions of the control device 7 by the hardware 9, the software, the firmware, or a combination thereof.

Embodiment 2

Figure 12:
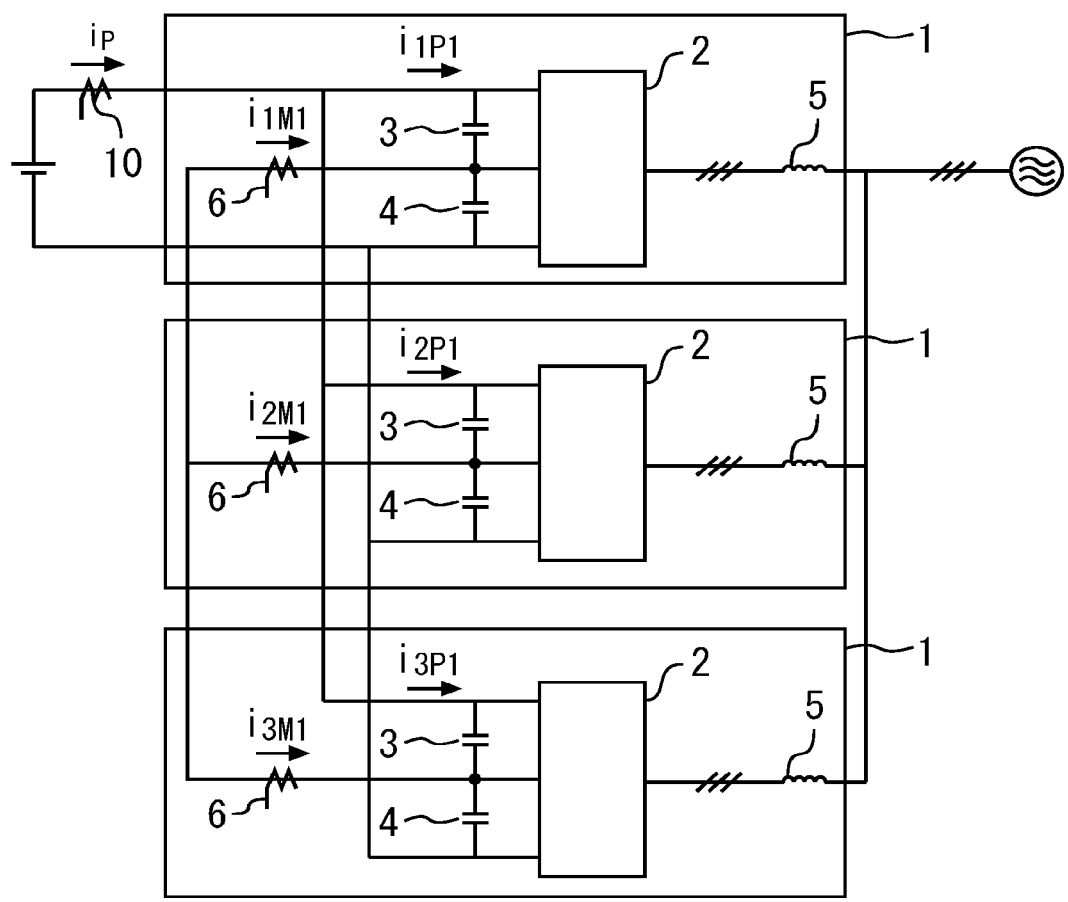
FIG. 12 is a configuration diagram of a multiple power conversion system according to Embodiment 2.

FIG. 12 is a configuration diagram of a multiple power conversion system according to Embodiment 2. Note that the parts same as or equivalent to the parts according to Embodiment 1 are denoted by the same reference numerals. Descriptions of the parts are omitted.

In the plurality of unit power converters 1 according to Embodiment 1, the DC neutral points M are not connected to one another. In contrast, in the plurality of unit power converters 1 according to Embodiment 2, the DC neutral points M are connected to one another.

For example, the plurality of DC side current sensors 6 are provided at the respective DC neutral points M of the plurality of unit power converters 1. Each of the plurality of DC side current sensors 6 is provided to detect a current flowing through the DC neutral point M of the corresponding one of the plurality of unit power converters 1.

For example, the plurality of DC side current sensors 6 are provided at the respective DC neutral points M of the unit power converters 1 except for one of the plurality of unit power converters 1 in some cases. In this case, each of the plurality of DC side current sensors 6 is provided to detect the current flowing through the DC neutral point of the corresponding one of the unit power converters 1 except for one of the plurality of unit power converters 1.

A DC side integration current sensor 10 is provided on the DC positive side P. The DC side integration current sensor 10 is provided to detect the current flowing through the DC positive side P.

The control device 7 calculates the nonuniform amount of the current flowing through each of the plurality of unit power converters 1 based on the detection results of the plurality of DC side current sensors 6.

The control device 7 controls operation of the switching element groups 2 of the plurality of unit power converters 1 based on the calculation results of the current nonuniform amounts.

Next, the principle of detecting short-circuit failure is described with reference to FIG. 13.

Figure 13:
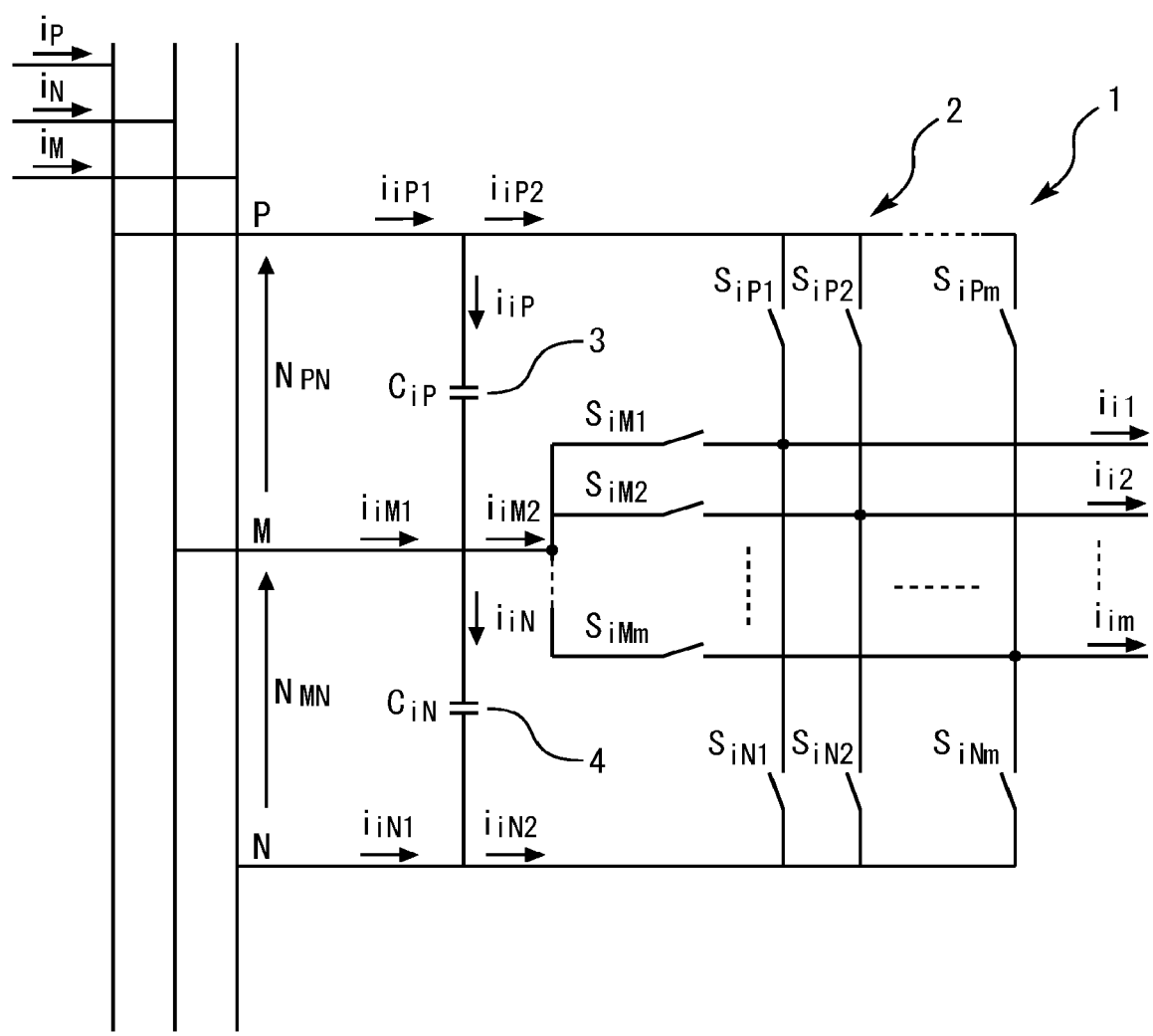
FIG. 13 is a configuration diagram of a main part of a unit power converter in the multiple power conversion system according to Embodiment 2.

FIG. 13 is a configuration diagram of a main part of one unit power converter in the multiple power conversion system according to Embodiment 2.

In a case where physical amounts are defined as illustrated in FIG. 13, the control device 7 detects the short-circuit failure based on the detected values of the DC side current sensor 6 and the DC side integration current sensor 10.

FIG. 14 and FIG. 15 are diagrams illustrating theoretical values of the nonuniform amount when the short circuit occurs in the multiple power conversion system according to Embodiment 2.

A physical amount with a subscript i is a physical amount in the unit power converter in which the short-circuit failure has occurred, and a physical amount with a subscript j is a physical amount in the unit power converter other than the unit power converter in which the short-circuit failure has occurred. In the power converter in which the short-circuit failure has occurred, the current nonuniform amount on the DC positive side P is $\Delta i_{iP1}$, the current nonuniform amount at the DC neutral point M is $\Delta i_{iM1}$, and the current nonuniform amount on the DC negative side N is $\Delta i_{iN1}$. In the power converter other than the power converter in which the short-circuit failure has occurred, the current nonuniform amount on the DC positive side P is $\Delta i_{jP1}$, the current nonuniform amount at the DC neutral point M is $\Delta i_{jM1}$, and the current nonuniform amount on the DC negative side N is $\Delta i_{jN1}$.

A value smaller than the nonuniform amounts $\Delta i_{iP1}$, $\Delta i_{iN1}$, and $\Delta i_{iM1}$ is set as the threshold to be compared with the nonuniform amount, which makes it possible to detect the short-circuit failure of the unit power converter.

Note that, in the case where the number n of unit power converters is three or more, the nonuniform amount of the unit power converter (with subscript i) in which the short-circuit failure has occurred becomes greater than the nonuniform amount of each of the other unit power converters (with subscript j). Therefore, the nonuniform amounts of the respective unit power converters detected by the control device are compared, and the unit power converter having the greatest nonuniform amount can be specified as the unit power converter in which the failure has occurred. This is because $(1-1/n) > 1/n$ is established.

According to Embodiment 2 described above, the circulating current is detected based on the detection results of the DC side current sensors 6 and the DC side integration current sensor 10. Therefore, the circulating current can be detected with a small number of current sensors.

Further, the plurality of unit power converters 1 are controlled based on the detection results of the DC side current sensors 6 and the DC side integration current sensor 10. Therefore, the circulating current can be suppressed with a small number of current sensors.

Further, each of the DC side current sensors 6 detects the current flowing through the corresponding DC neutral point M. The current is smaller than the current flowing through the DC positive side P and the current flowing through the DC negative side N. Accordingly, it is possible to reduce the rating of each of the DC side current sensors 6. In this case, a conductor may be thin. This facilitates arrangement of the DC side current sensors 6. As a result, it is possible to enhance flexibility of mounting of the DC side current sensors 6.

The case where the plurality of DC side current sensors 6 are provided at the respective DC neutral points M has been described. Alternatively, as can be seen from FIG. 14 and FIG. 15, when the plurality of DC current sensors 6 are not provided at the respective DC neutral points M but are provided on the respective DC positive sides P and a plurality of DC current sensors 6' are provided on the respective DC negative sides N, the short-circuit failure can be detected by calculating the nonuniform amounts $\Delta i_{iP1}$ and $\Delta i_{iN1}$ on the positive sides P and the negative sides N, and comparing the nonuniform amounts $\Delta i_{iP1}$ and $\Delta i_{iN1}$ with the threshold.

Embodiment 3

Figure 16:
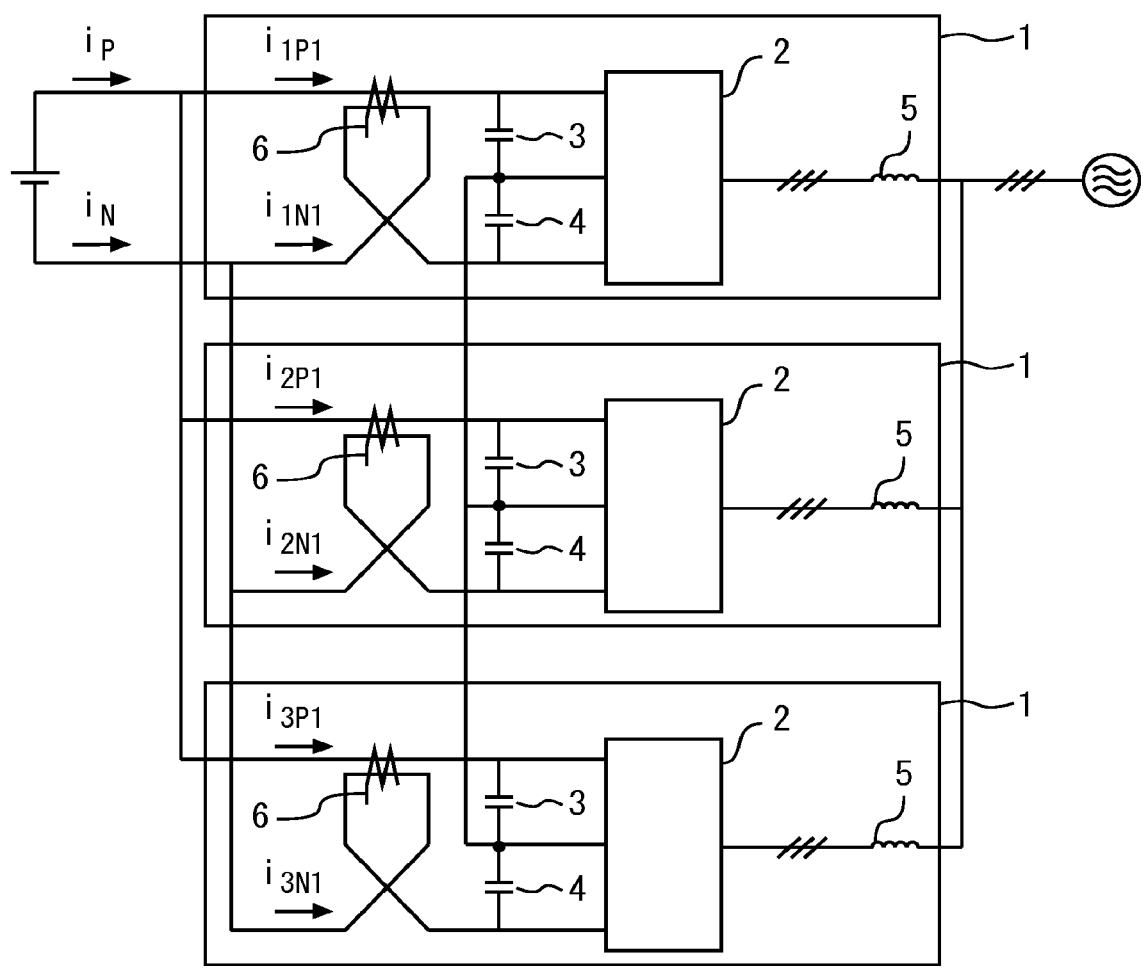
FIG. 16 is a configuration diagram of a multiple power conversion system according to Embodiment 3.

FIG. 16 is a configuration diagram of a multiple power conversion system according to Embodiment 3. Note that the parts same as or equivalent to the parts according to Embodiment 2 are denoted by the same reference numerals. Descriptions of the parts are omitted.

In Embodiment 3, the plurality of DC side current sensors 6 are provided on the respective unit power converters 1. Each of the plurality of DC side current sensors 6 is provided to detect a difference between the current flowing through the DC positive side P and the current flowing through the DC negative side N of the corresponding one of the plurality of unit power converters 1 at once.

FIG. 17 is a diagram illustrating the theoretical values of the nonuniform amount when the short circuit occurs in the multiple power conversion system according to Embodiment 3.

A physical amount with a subscript i is a physical amount in the unit power converter in which the short-circuit failure has occurred, and a physical amount with a subscript j is a physical amount in the unit power converter other than the unit power converter in which the short-circuit failure has occurred. In the power converter in which the short-circuit failure has occurred, the current nonuniform amount on the DC positive side P is $\Delta i_{iP1}$, and the current nonuniform amount on the DC negative side N is $\Delta i_{iN1}$. In the power converter other than the power converter in which the short-circuit failure has occurred, the current nonuniform amount on the DC positive side P is $\Delta i_{jP1}$, and the current nonuniform amount on the DC negative side N is $\Delta i_{jN1}$.

A value smaller than the nonuniform amount $\Delta i_{iP1}$ or $\Delta i_{iN1}$ shown in FIG. 17 is set as the threshold to be compared with the nonuniform amount, which makes it possible to detect the short-circuit failure of the unit power converter.

Note that, in the case where the number n of unit power converters is three or more, the nonuniform amount of the unit power converter (with subscript i) in which the short-circuit failure has occurred becomes greater than the nonuniform amount of each of the other unit power converters (with subscript j) Therefore, the nonuniform amounts of the respective unit power converters detected by the control device are compared, and the unit power converter having the greatest nonuniform amount can be specified as the unit power converter in which the failure has occurred. This is because $(1-1/n)>1/n$ is established.

According to Embodiment 3 described above, each of the plurality of DC side current sensors 6 detects differences between the currents flowing through the DC positive side P and the DC negative side N of the plurality of unit power converters 1 at once. Therefore, the circulating current can be detected with a small number of current sensors.

Further, the control device can detect the short-circuit failure of all of the mode A to the mode D based on the detection results of the plurality of DC side current sensors 6.

Embodiment 4

Figure 18:
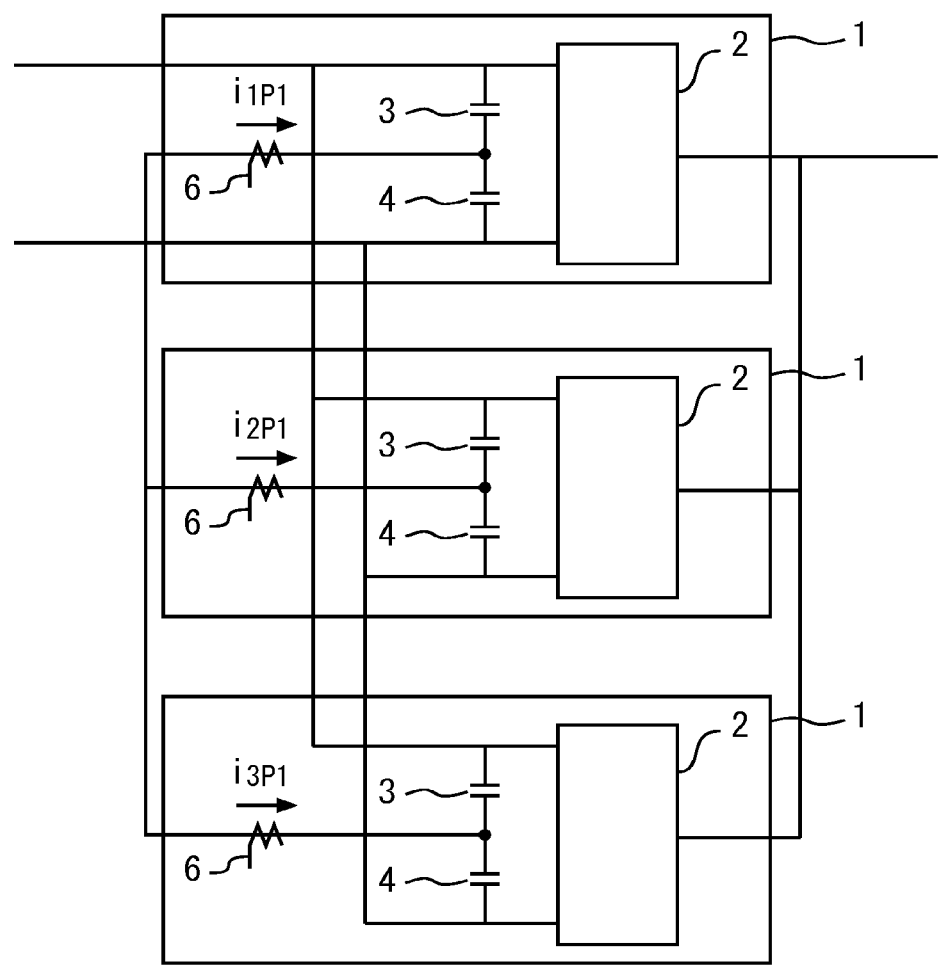
FIG. 18 is a configuration diagram of a multiple power conversion system according to Embodiment 4.

FIG. 18 is a configuration diagram of a multiple power conversion system according to Embodiment 4. Note that the parts same as or equivalent to the parts according to Embodiment 2 are denoted by the same reference numerals. Descriptions of the parts are omitted.

Each of the unit power converters 1 according to Embodiment 4 is a two-level power converter.

Next, a first example of each of the unit power converters 1 is described with reference to FIG. 19.

Figure 19:
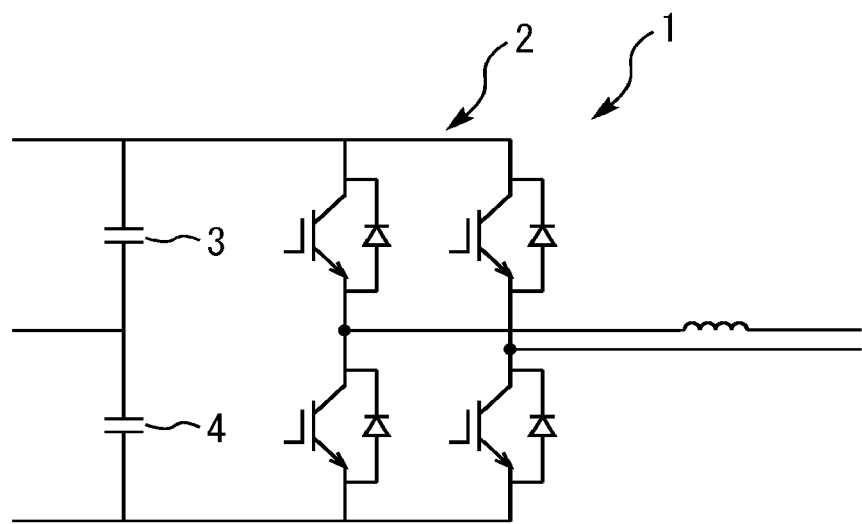
FIG. 19 is a configuration diagram of a first example of a unit power converter in the multiple power conversion system according to Embodiment 4.

FIG. 19 is a configuration diagram of the first example of one unit power converter in the multiple power conversion system according to Embodiment 4.

FIG. 19 illustrates a configuration example of the two-level unit power converter 1 that converts DC power into AC power.

Next, a second example of each of the unit power converters 1 is described with reference to FIG. 20.

Figure 20:
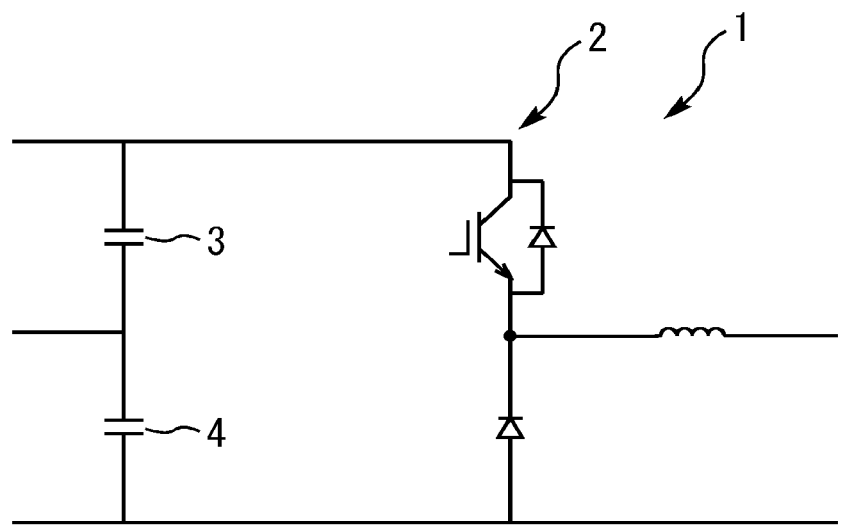
FIG. 20 is a configuration diagram of a second example of the unit power converter in the multiple power conversion system according to Embodiment 4.

FIG. 20 is a configuration diagram of the second example of one unit power converter in the multiple power conversion system according to Embodiment 4.

FIG. 20 illustrates a configuration example of the two-level power converter 1 that converts DC power into DC power.

According to Embodiment 4 described above, the DC side current sensors 6 are provided in the respective two-level unit power converters 1. Even in this case, the circulating current can be detected with a small number of current sensors.

Embodiment 5

Figure 21:
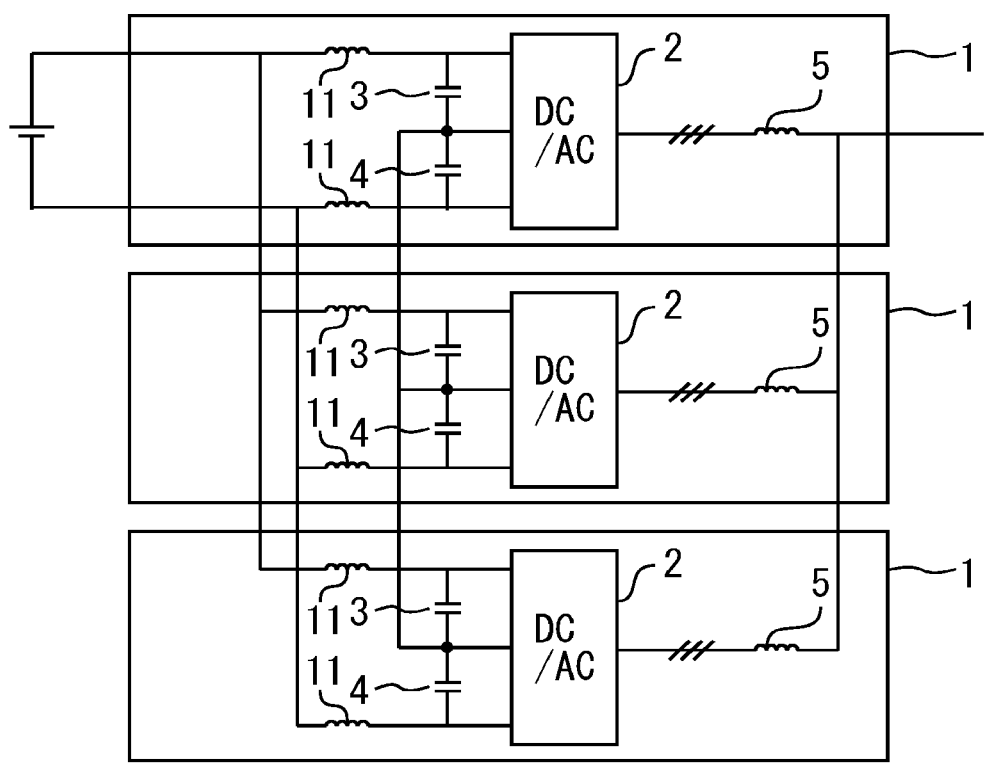
FIG. 21 is a configuration diagram of a multiple power conversion system according to Embodiment 5.

FIG. 21 is a configuration diagram of a multiple power conversion system according to Embodiment 5. Note that the parts same as or equivalent to the parts according to Embodiment 2 are denoted by the same reference numerals. Descriptions of the parts are omitted.

In Embodiment 5, a plurality of reactors 11 are provided on the DC positive sides P and the DC negative sides N of the plurality of unit power converters 1.

According to Embodiment 5 described above, the plurality of reactors 11 are provided on the DC positive sides P of the plurality of unit power converters 1. Also, in this case, the circulating current can be detected with a small number of current sensors.

Note that the reactors 11 may be provided on the respective DC neutral points M. Also, in this case, the circulating current can be detected with a small number of current sensors.

Embodiment 6

Figure 22:
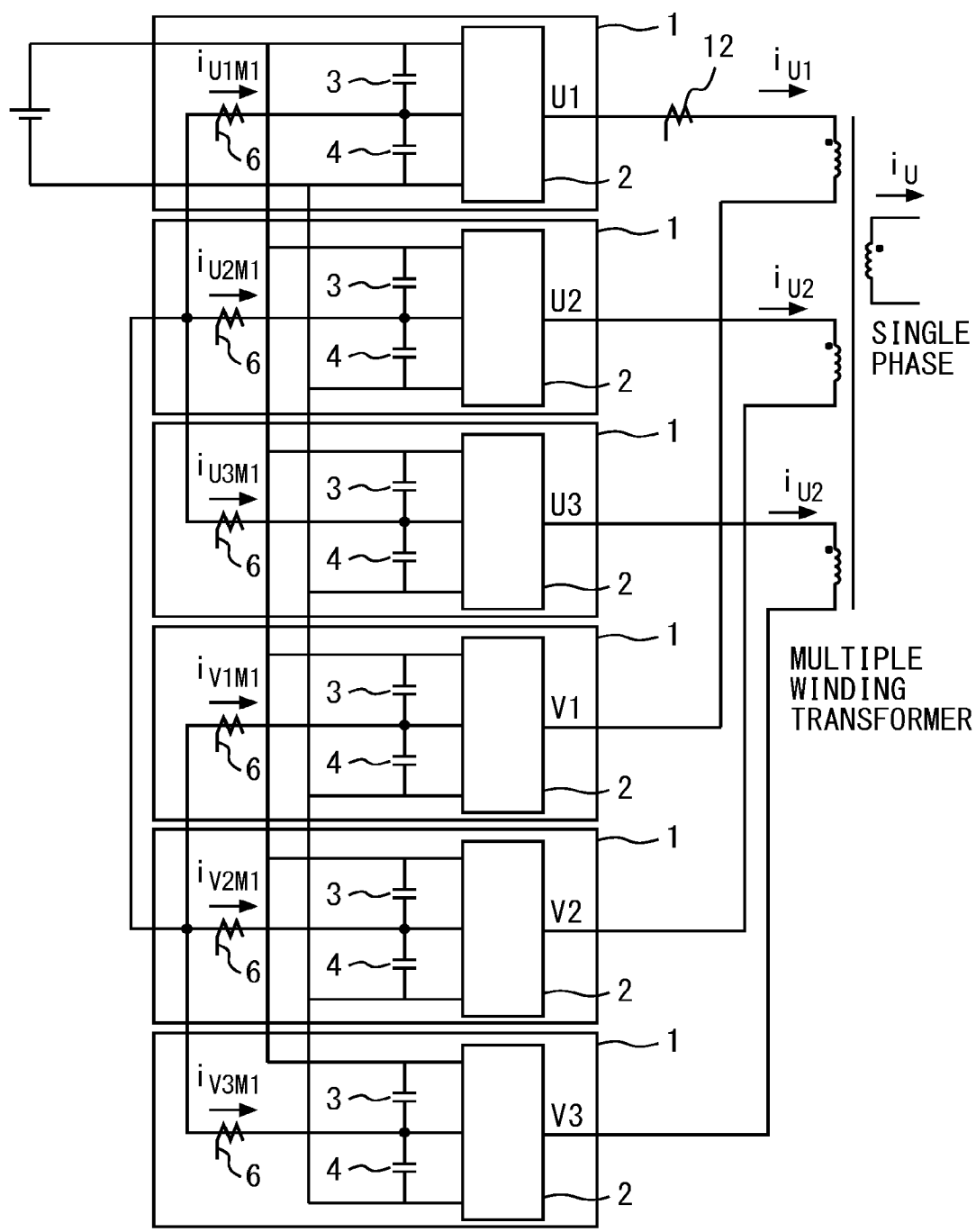
FIG. 22 is a configuration diagram of a multiple power conversion system according to Embodiment 6.

FIG. 22 is a configuration diagram of a multiple power conversion system according to Embodiment 6. Note that the parts same as or equivalent to the parts according to Embodiment 2 are denoted by the same reference numerals. Descriptions of the parts are omitted.

In Embodiment 6, an output side of each of the plurality of unit power converters 1 is connected to a single-phase multiple winding transformer. Each of the plurality of unit power converters 1 is a unit power converter 1 for one phase.

An AC side current sensor 12 is provided on the output side of any one of the plurality of unit power converters 1.

According to Embodiment 6 described above, as a result of suppression of a nonuniform amount $\Delta i_{UiM1}$ and a nonuniform amount $\Delta i_{ViM1}$ on the input side, a nonuniform amount $\Delta i_{Ui}$ and a nonuniform amount $\Delta i_{Vi}$ on the output side are also suppressed. Accordingly, it is sufficient to provide one AC side current sensor 12.

Embodiment 7

Figure 23:
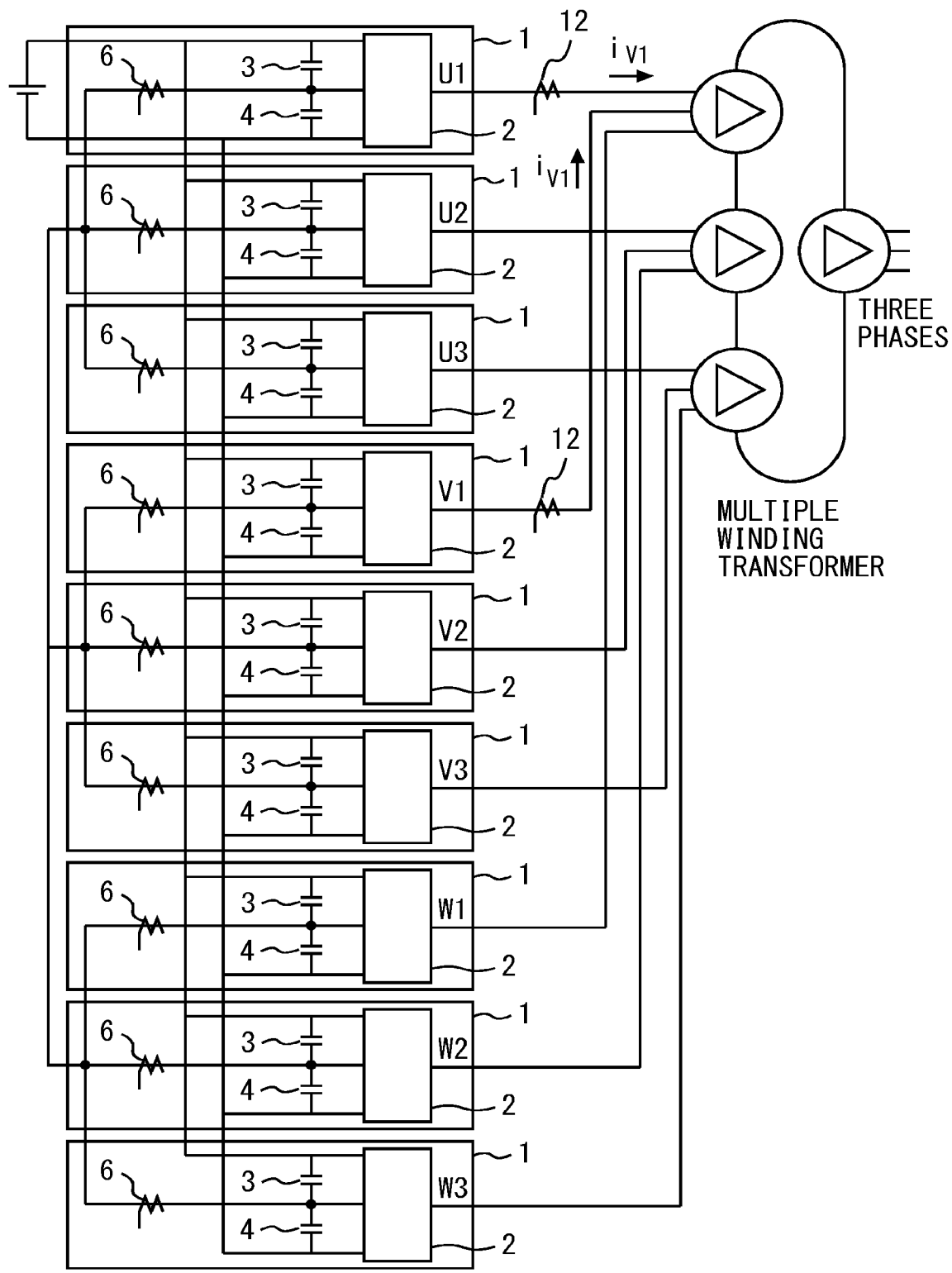
FIG. 23 is a configuration diagram of a multiple power conversion system according to Embodiment 7.

FIG. 23 is a configuration diagram of a multiple power conversion system according to Embodiment 7. Note that the parts same as or equivalent to the parts according to Embodiment 6 are denoted by the same reference numerals. Descriptions of the parts are omitted.

In Embodiment 7, the output side of each of the plurality of unit power converters 1 is connected to a three-phase multiple winding transformer.

Each of a plurality of AC side current sensors 12 is provided on the output side of the unit power converter 1 corresponding to two phases of the plurality of unit power converters 1.

According to Embodiment 7 described above, each of the plurality of AC side current sensors 12 is provided on the output side of the unit power converter 1 corresponding to the two phases of the plurality of unit power converters 1. Also, in this case, the circulating current can be suppressed, and the number of current sensors can be reduced.

Normally, in a case of a main circuit configuration as illustrated in FIG. 23, the current sensors on the AC side are provided at, for example, points U1, U2, U3, V1, V2, and V3 in order to detect and suppress the circulating current among the points U1, U2, and U3, the circulating current among the points V1, V2, and V3, and the circulating current among points W1, W2, and W3 or in order to detect failure. The current sensors for the W phase are unnecessary because the current in the W phase can be calculated from Kirchhoff's current law. At this time, when the current sensors 6 are provided at the respective neutral points of the unit power converters as with the present embodiment, the circulating current can be suppressed by these sensors, or the failure can be detected as with Embodiment 2. Accordingly, it is unnecessary to use the current values at all of the points U1, U2, U3, V1, V2, and V3. This makes it possible to reduce the number of sensors on the AC side to two sensors at, for example, the two points U1 and V1. The reason of remaining the current sensors at the points U1 and V1 is to recognize a total value of the currents on the AC side. Under a condition that the circulating current does not flow, namely, the nonuniform amount is not present in each of the current sensors 6 provided in each phase, the current values at the points U1, U2, and U3 are equivalent to one another, the current values at the points V1 V2, and V3 are equivalent to one another, and the current values at the points W1, W2, and W3 are equivalent to one another. Using the fact and Kirchhoff's current law allows for estimation of the current values at all of the points U1, U2, U3, V1, V2, V3, W1, W2, and W3. As a result, a total value of the currents on the AC side can be estimated.

Embodiment 8

Figure 24:
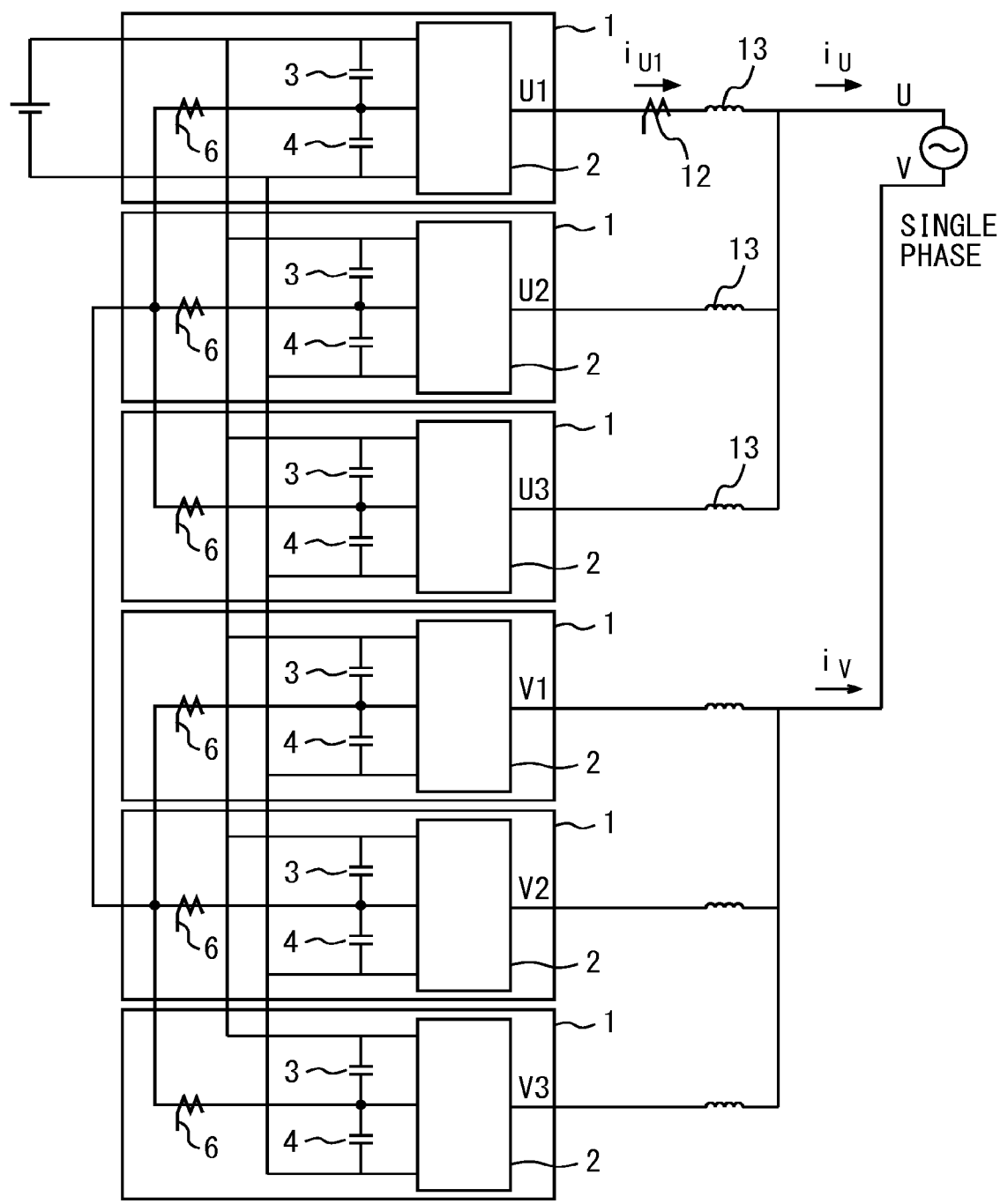
FIG. 24 is a configuration diagram of a multiple power conversion system according to Embodiment 8.

FIG. 24 is a configuration diagram of a multiple power conversion system according to Embodiment 8. Note that the parts same as or equivalent to the parts according to Embodiment 6 are denoted by the same reference numerals. Descriptions of the parts are omitted.

In Embodiment 8, a plurality of reactors 13 are provided on the respective output sides of the plurality of unit power converters 1.

According to Embodiment 8 described above, the plurality of reactors 13 are provided on the respective output sides of the plurality of unit power converters 1. Also, in this case, the circulating current can be suppressed, and the number of current sensors can be reduced.

Normally, in a case of a main circuit configuration as illustrated in FIG. 24, the current sensors on the AC side are provided at, for example, points U1, U2, and U3 in order to detect and suppress the circulating current among the points U1, U2, and U3 or in order to detect failure. The current sensors for the V phase are unnecessary because the current in the V phase can be calculated from Kirchhoff's current law. At this time, when the current sensors 6 are provided on the respective neutral points of the unit power converters as with the present embodiment, the circulating current can be suppressed by these sensors, or the failure can be detected as with Embodiment 2. Accordingly, it is unnecessary to use the current values at all of the points U1, U2, and U3. This makes it possible to reduce the number of sensors on the AC side to one sensor at, for example, the point U1. The reason of remaining the current sensor at the point U1 is to recognize a total value of the currents on the AC side. Under the condition that the circulating current does not flow, namely, the nonuniform amount is not present in each of the current sensor 6 provided in each phase, the current values at the points U1, U2, and U3 are equivalent to one another, and the current values at the points V1, V2, and V3 are equivalent to one another. Using the fact and Kirchhoff's current law allows for estimation of the current values at all of the points U1, U2, U3, V1, V2, and V3. As a result, a total value of the currents on the AC side can be estimated.

Embodiment 9

Figure 25:
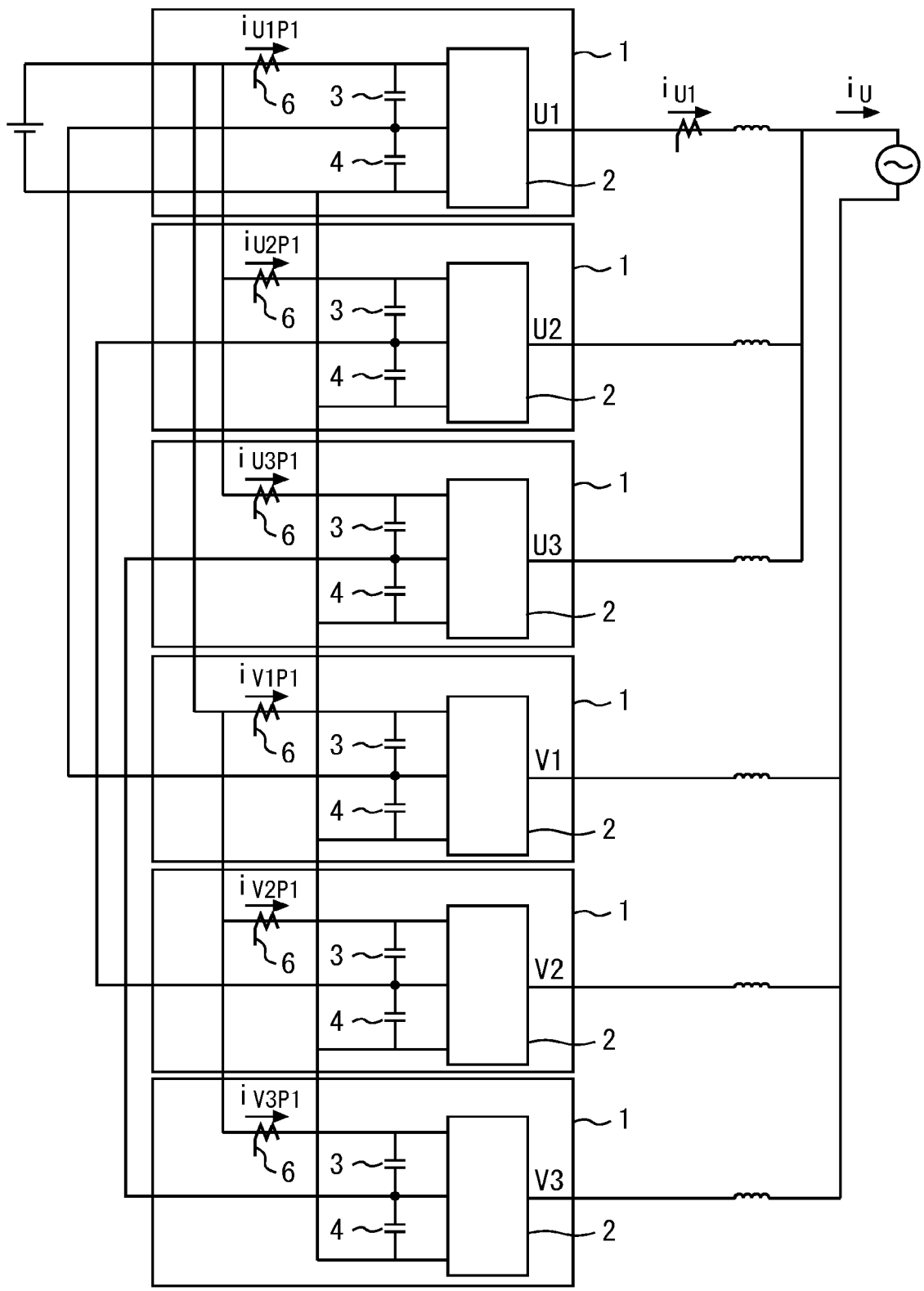
FIG. 25 is a configuration diagram of a multiple power conversion system according to Embodiment 9.

FIG. 25 is a configuration diagram of a multiple power conversion system according to Embodiment 9. Note that the parts same as or equivalent to the parts according to Embodiment 6 are denoted by the same reference numerals. Descriptions of the parts are omitted.

In Embodiment 9, the plurality of unit power converters 1 are divided into sets corresponding to different phases. In the unit power converters 1 in each of the sets, the DC neutral points M are connected to one another. In the unit power converters 1 in the different sets, the DC neutral points M are not connected to one another.

In this case, for example, the plurality of DC side current sensors 6 are provided on the respective DC positive sides P of the plurality of unit power converters 1. Each of the plurality of DC side current sensors 6 is provided to detect a current flowing through the DC positive side P of the corresponding one of the plurality of unit power converters 1.

For example, the plurality of DC side current sensors 6 are provided on the respective DC negative sides N of the plurality of unit power converters 1 in some cases. In this case, each of the plurality of DC side current sensors 6 is provided to detect a current flowing through the DC negative side N of the corresponding one of the plurality of unit power converters 1.

According to Embodiment 9 described above, in the unit power converters 1 in each of the sets, the DC neutral points M are connected to one another. In the unit power converters 1 in the different sets, the DC neutral points M are not connected to one another.

Normally, in a case of a main circuit configuration as illustrated in FIG. 25, the current sensors on the AC side are provided at, for example, points U1, U2, and U3 in order to detect and suppress the circulating current among the points U1, U2, and U3 and the circulating current among the points V1, V2, and V3 or in order to detect failure. The current sensors for the V phase are unnecessary because the current in the V phase can be calculated from Kirchhoff's current law. At this time, when the current sensors 6 are provided on the respective DC sides of the unit power converters, the circulating current can be suppressed by these sensors, or the failure can be detected as with Embodiment 2. Accordingly, it is unnecessary to use the current values at all of the points U1, U2, and U3. This makes it possible to reduce the number of sensors on the AC side to one sensor at, for example, the point U1. The reason of remaining the current sensor at the point U1 is to recognize a total value of the currents on the AC side. Under the condition that the circulating current does not flow, namely, the nonuniform amount is not present in each of the current sensor 6 provided in each phase, the current values at the points U1, U2, and U3 are equivalent to one another, and the current values at the points V1, V2, and V3 are equivalent to one another. Using the fact and Kirchhoff's current law allows for estimation of the current values at all of the points U1, U2, U3, V1, V2, and V3. As a result, a total value of the currents on the AC side can be estimated.

In the case where the current sensors are provided on the DC sides while, on the AC side, the current sensor is provided only at the point U1 as with the present embodiment, the failure can be detected at high speed as compared with the case where the current sensors are provided at the points U1, U2, and U3 on the AC side. This is because change of the current when the failure occurs is steeper on the DC side than on the AC side.

Note that, in each of the plurality of unit power converters 1, a plurality of switches may be provided on at least two of the DC positive side P, the DC negative side N, and the DC neutral point M. In this case, the plurality of switches in the unit power converters 1 in failure are turned off based on the detected values of the plurality of DC side current sensors 6. As a result, it is possible to remain the unit power converters 1 not in failure and to maintain the operation of the multiple power conversion system. This is effective for all of Embodiment 1 to Embodiment 9.

INDUSTRIAL APPLICABILITY

As described above, the multiple power conversion system according to the present invention is usable in a system that detects the circulating current with a small number of current sensors.

REFERENCE SIGNS LIST

1 Unit power converter
2 Switching element group
3 Positive-side DC capacitor
4 Negative-side DC capacitor
5 Reactor
6 DC side current sensor
7 Control device
8a Processor
8b Memory
9 Hardware
10 DC side integration current sensor
11 Reactor
12 AC side current sensor
13 Reactor

The invention claimed is:

1. A multiple power conversion system comprising:
a plurality of unit power converters, wherein
each of the plurality of unit power converters includes a DC neutral point which is a connection point of two DC capacitors provided between a DC positive side and a DC negative side, and a DC side current sensor which detects a current flowing through the DC neutral point,
the DC positive side of each unit power converters is connected to a first parallel connection point provided on a DC side,
the DC negative side of each unit power converters is connected to a second parallel connection point provided on a DC side, and
the DC neutral point of each unit power converters is connected to a third parallel connection point provided on a DC side,
the multiple power conversion system comprising:
a DC side integrated current sensor that is disposed between the first parallel connection point and a power supply and detects a current on a DC positive side flowing through the first parallel connection point; and
a control device for controlling each unit power converters, wherein
the DC side current sensor is configured to detect current flowing through a DC neutral point of a target unit power converter among the plurality of unit power converters, and
the control device configured to:
calculate a nonuniform amount of the current flowing through each of the plurality of unit power converters based on detected values of the DC side current sensor and a DC side integration current sensor; and
specify a unit power converter in which a short circuit failure has occurred among the plurality of unit power converters based on the current nonuniform amounts.

2. The multiple power conversion system according to claim 1, further comprising the control device configured to perform protective operation of the plurality of unit power converters when the current nonuniform amounts is greater than a threshold.

3. The multiple power conversion system according to claim 2, wherein the control device turns off a switching element for at least one phase included in at least one of the plurality of unit power converters.

4. The multiple power conversion system according to claim 2, wherein
each of the plurality of unit power converters includes a plurality of switches provided on at least two of the DC positive side, the DC negative side, and the DC neutral point, and
the control device turns off the plurality of switches in a unit power converter in failure based on detected values of the current sensors.

5. The multiple power conversion system according to claim 1, further comprising the control device configured to transmit, to each of the plurality of unit power converters, a same gate signal or a gate signal generated from a same voltage instruction value.

6. The multiple power conversion system according to claim 1, wherein the plurality of unit power converters are configured to be a three phase or single-phase.

7. The multiple power conversion system according to claim 1, wherein the control device configured to specify a unit power converter having the greatest nonuniform amount among the plurality of unit power converters as a unit power converter in which a short circuit failure has occurred.

* * * * *